Oct. 1, 1968     P. D. HURWITZ     3,403,416
AUTOMOTIVE VEHICLE WASHING UNIT
Filed July 18, 1966     2 Sheets-Sheet 1
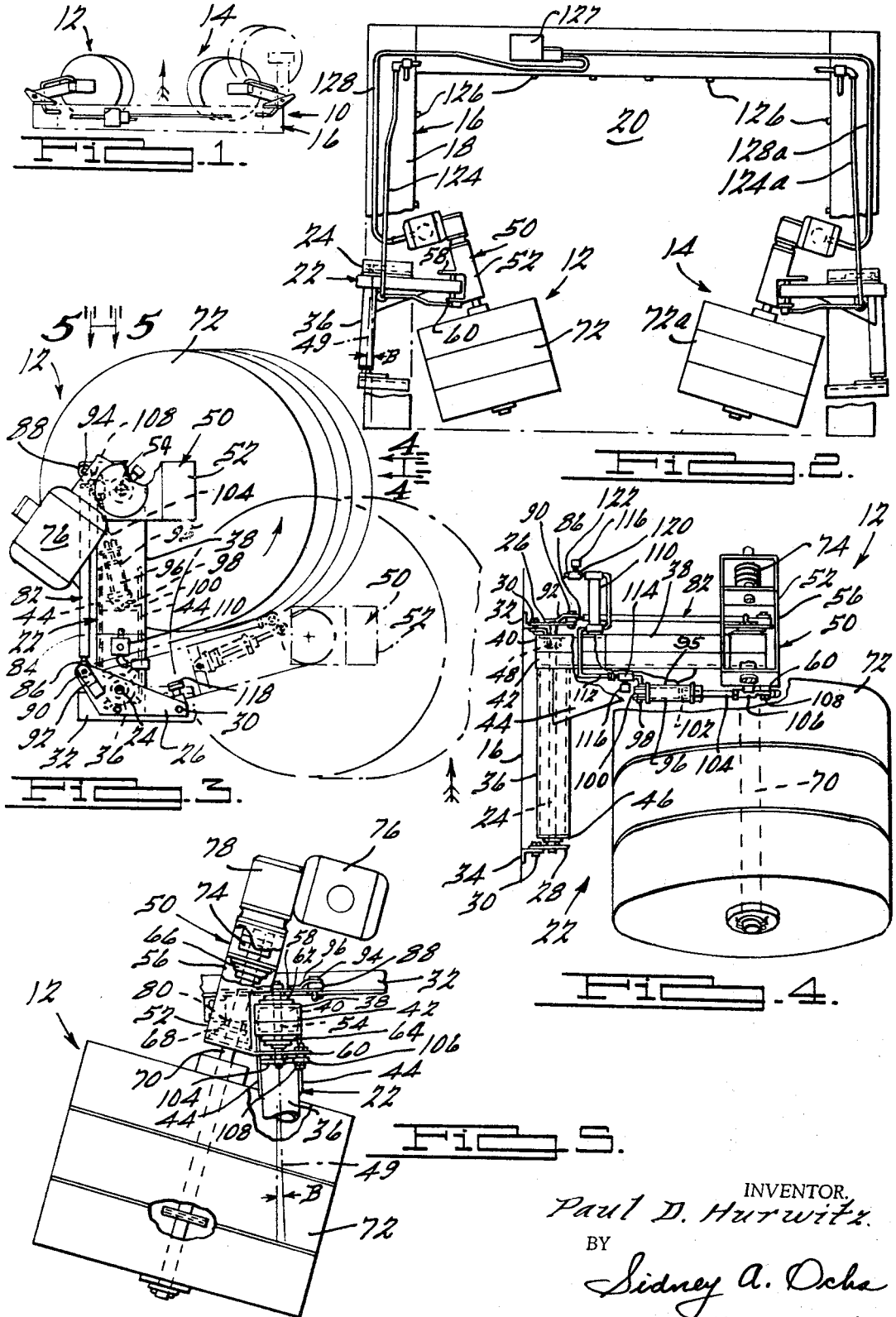
INVENTOR.
Paul D. Hurwitz
BY
Sidney A. Ochs
ATTORNEY.

Oct. 1, 1968  P. D. HURWITZ  3,403,416

AUTOMOTIVE VEHICLE WASHING UNIT

Filed July 18, 1966  2 Sheets-Sheet 2

INVENTOR.
Paul D. Hurwitz.
BY
Sidney A. Ochs
ATTORNEY.

United States Patent Office 3,403,416
Patented Oct. 1, 1968

3,403,416
AUTOMOTIVE VEHICLE WASHING UNIT
Paul D. Hurwitz, Wyncote, Pa., assignor to Sherman Car Wash Equipment Co., Palmyra, N.J., a corporation of New Jersey
Filed July 18, 1966, Ser. No. 565,776
12 Claims. (Cl. 15—21)

ABSTRACT OF THE DISCLOSURE

A vehicle washing apparatus having a rotatable brush swingable by a hanger between retracted and engaged positions relative to the sides of vehicles of different width, the brush sloping upwardly and outwardly relative to such sides and maintaining substantially the same posture in such engaged positions regardless of car width whereby to effectively clean inwardly and upwardly curved surfaces of rocker and other panels. A head pivotally supports the brush outboard of the hanger and suitable means such as linkage or chain-sprocket mechanisms operate between the head and hanger support during swing of the hanger to maintain said brush posture.

---

This invention relates to vehicle washing apparatus and more especially to apparatus for washing and cleaning the lower side portions of automotive vehicles, for example, the rocker panels thereof during relative movement of the apparatus and vehicle along a predetermined path of travel.

Automatic washing systems in use today are able to effect satisfactory cleaning of most portions of an automotive vehicle body and related parts. Some areas which have not received adequate treatment by the usual vertical side brushes provided for this purpose are the lower side panels such as the rocker panels, which curve inwardly, and other up and under hard to reach surfaces such as wheel fender openings and hub caps.

It has been proposed to meet some of these conditions by providing a brush which slopes upwardly and outwardly away from the path of travel of the vehicle passing through the apparatus as shown in the patents to Vani 3,070,821 and Vani et al. 3,090,981. The brushes in each of these arrangements while capable of a proper slope for one width of car, change their slope relative to the sides of cars of different width in moving through a substantial angle of travel between fully retracted to fully extended position required to include all widths of cars encountered today in car wash operations. They are therefore not as effective as desired and leave uncleaned areas at the rocker panels and lower edges of the fenders.

The present invention overcomes these problems and it is an object of the invention to provide a brush type washing apparatus capable of providing a constant slope or angle to the brush relative to the vertical throughout its arc of movement from its fully retracted position to its fully extended position such that the brush provides and maintains the same efficient cleaning angle relative to the vehicle body regardless of brush position or car width. In this way the brushes are able to get up and under the rocker panels, for example, for complete, full time cleaning as they move in or out to accommodate various car widths and thoroughly clean the rocker panels and at the same time do a first class job on hub caps and fender openings.

Another object of the invention is to provide washing apparatus as in the preceding object wherein the brush has a predetermined direction of rotation relative to the vehicle, specifically one where the contact point of the brush moves with the vehicle and has a higher linear speed than the vehicle whereby to minimize the chances of drag, snagging, and catching of the brush regardless of car contour or shape.

A further feature of the invention is to provide in combination with a constant angle brush structure as defined in the previous objects, means for regulating the rate of movement of the brush into contact with the vehicle to be cleaned to inhibit too fast a movement and to resist any sudden movement toward extended position as the brush follows the contour of the vehicle body in such areas as the wheel wells.

A further object is to provide a brush structure as in the preceding object wherein the regulating means may comprise an adjustable restriction valve located between a cylinder containing fluid acted upon by a piston operably connected with the brush head and a fluid reservoir located on the brush hanger means.

Still another object of the invention is to provide an apparatus as in the preceding object wherein the piston acts to draw fluid from the reservoir to the cylinder upon manual retraction of the brush from the path of the vehicle or wherein air under pressure is impressed upon the fluid in the reservoir to direct fluid to the cylinder where it may act upon the piston to return the brush to its fully retracted position.

The above and other objects of the invention will be more readily apparent from the following description taken in conjunction with the accompanying drawings in which:

FIGURE 1 is a plan view of a support structure carrying opposite side brushes embodying the features of the invention and between which a vehicle may pass in the direction of the arrow in this figure for cleaning of the lower side portions of the vehicle;

FIGURE 2 is an enlarged elevational view looking at the entrance side of the structure of FIGURE 1 and showing the brush units of the invention in their fully extended position and showing associated elements of structure;

FIGURE 3 is a plan view of the left hand brush unit of FIGURE 2 showing the brush in its fully retracted or "out" position and showing in phantom the fully extended or "in" position of the brush unit and associated structure;

FIGURE 4 is an elevational view of the brush structure of FIGURE 3 looking in the direction of the arrows 4—4 in FIGURE 3;

FIGURE 5 is a further elevational view of the brush unit of FIGURE 3 looking in the direction of the arrows 5—5 in FIGURE 3;

Figure 6:
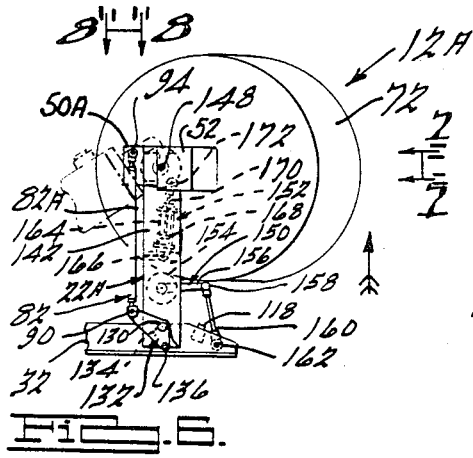
FIGURE 6 is a plan view of a modification of the apparatus of the invention illustrating the use of a conventional door check mechanism for controlling the movement of the brush toward the vehicle to be cleaned and showing a fluid motor operable between the brush head and brush hanger means for actuating the brush unit to its retracted position.

Referring now to the drawings wherein similar numerals designate corresponding parts of the structure, FIGURES 1 to 5 show a car washing apparatus generally designated by the numeral 10, comprised of a pair of opposite brush units 12, 14, each embodying the principles of the present invention and illustrating a preferred embodiment for cleaning the lower side portions of a vehicle. The apparatus 10 is preferably mounted on supporting means such as a member 16 comprised of a substantially arch-shaped housing 18 (FIGURES 1 and 2) of angle iron and plates, arranged to straddle a suitable conventional rail-type guideway (not shown) for guiding a vehicle in operative position relative to the brush units 12, 14 as it moves centrally through the archway 20 in the direction of the arrow in FIGURE 1. It will be understood that instead of moving the vehicle through the housing 18 the latter may be rolled relative to a stationary vehicle. Moreover the housing 18 may include other well known elements of a cleaning line of which the units 12, 14 map constitute components.

As will be evident from FIGURES 1 and 2, the units 12, 14 are substantially identical in construction except that one is a mirror image of the other but each functions in a similar manner. Hence, only the left hand unit 12 will be described in detail and any reference to corresponding parts of the right hand unit 14 will be by similar numerals carrying the suffix $a$ added thereto.

The washing apparatus unit 12 comprises brush hanger means generally designated by the numeral 22, pivotally supported by a shaft 24 in upper and lower plate supports 26, 28 respectively, secured as by bolts 30 to angle framing 32, 34 forming part of the support 16. The brush hanger means 22 is composed of a generally vertical tubular post 36 to the upper end of which is welded an outwardly extending arm 38 of box-like section which may be formed of two channel shaped sections 40, 42 welded together as seen in FIGURE 5. Gusset plates 44 connect the post and arm and are welded thereto to stiffen the same. A flanged bearing member 46 secured to the lower end of the post 36 and a similar bearing member 48 mounted on the upper side of the arm 38 interiorly thereof serves to support the pivot shaft 24. It will be noted that in the preferred embodiment of FIGURES 1 to 5 the pivot shaft 24 and post 36 have their common axis 49 forming an acute angle B with the vertical. Stated otherwise these members tip about three degrees off the vertical as seen in FIGURES 2 and 5 toward the archway 20 or vehicle path so that gravity acting on the unit 12 will normally swing it from its fully retracted or "out" position, wherein the arm 38 generally parallels the vehicle path of travel, as seen in FIGURE 3, to its fully extended or "in" position shown in FIGURE 2, and in phantom in FIGURE 3, or to an intermediate position wherein the brush unit 12 contacts the side of a vehicle.

The unit 12 further comprises a brush head generally designated by the numeral 50, pivotally mounted to the outer end of the arm 38 of the hanger means 22, by an L-shaped bracket 52, through a pivot shaft 54. As seen in FIGURES 4 and 5 the leg portion of the L-bracket is an open, frame-like rectangular structure 56 and the base portion of the L-bracket comprises a pair of plate-like ears 58, 60 connecting with the leg 56 and straddling the arm 38. These ears receive and hold the pivot shaft 54, and the latter is journalled in upper and lower bearing members 62, 64 respectively secured to the upper and lower sides of the arm 38 between the ears 58, 60. As seen in FIGURE 5 the frame-like leg 56 of the L-bracket 52 supports two spaced bearing journals 66, 68 whose axis is at an acute angle to the vertical and to an angle of less than 90 degrees relative to the pivot shaft or rod 54 such that a brush shaft 70 carried in these journals extends downwardly and outwardly away from the base ears 58, 60. The lower end of shaft 70 carries a multi-sectioned soft synthetic bristle brush 72 and the upper end is connected through a conventional flexible coupling 74 with a brush drive motor 76 through a reduction gear 78 all securely mounted on the upper end of the frame-like L portion 56 of the bracket 52. A pinned collar 80 on the shaft 70 at the upper side of the journal 68 retains the brush and its shaft relative to the bracket. The motor 76 is arranged to rotate the brush 72 in a direction counter-clockwise in FIGURE 3, such that its periphery in contact with the side of a vehicle moves in the same direction as the real or apparent direction of the vehicle and at a linear speed greater than that of the real or apparent ground speed of the vehicle.

In some instances it may be desired to have the swing axis 49 of the unit 12 perfectly vertical and in such cases suitable means such as a spring (not shown) acting between the arm 38 and the support 16 or between the arm 38 and head bracket 52 may urge the unit toward its extended position or such may be accomplished by a fluid motor device as hereinafter described.

The unit 12 also comprises means for maintaining the brush 72 at a constant angle relative to vertical planes extending longitudinally of the path of movement determined by the relative movement of the apparatus and vehicle and representing the sides of vehicles in such path whereby the brush is presented to the lower portions of the vehicle, for example the rocker panels, at substantially the same angle and regardless of the width of the vehicle being engaged by the brush, or stated otherwise, regardless of the position of the brush hanger means 22 between its fully retracted and fully extended positions seen in FIGURE 3.

In the preferred embodiment of FIGURES 2 to 5 this means comprises link means generally designated by the numeral 82 pivotally connecting the support plate 26 for the brush hanger means 22 and the ear 58 of the bracket 52 of the brush head 50. This link means 82 comprises an elongated tubular rod 84 threaded at each end to adjustably receive the eye members 86, 88, the former pivotally connected to the plate 26 by a pivot rod or shaft 90 extending between the plate 26 and a bearing bracket 92 secured to the plate 26 (FIGURE 4) and the latter connected to the ear 58 by a pin pivot shaft 94 extending between the ear 58 and a bearing bracket 96 secured to the ear 58 (FIGURE 5). The eye members are adjustable to alter the distance between the pivots 90, 94 so as to facilitate a parallelogram type of action of the arm 38 of the hanger means 22 and the bracket 52 of the brush head 50 whereby the brush head as seen in FIGURE 3 maintains its same position normal to the aforementioned vertical planes representative of the sides of the vehicle during all swing positions of the arm 38. In this manner the brush 72 and the shaft 70 maintain the same angular relationship to said planes and thus to the sides of the vehicle in all positions of the unit 12. Such is possible when the distance between the pivots 90, 94 is substantially the same as that between the pivot shaft 24 of the hanger means 22 and the pivot shaft 54 of the brush head 50 and the distance between the pivot 90 and shaft 24 is substantially the same as that between the pivot 94 and shaft 54.

As previously described the unit 12 is supported to have gravity or suitable means, such as a spring, normally urge the brush unit 12 to its extended position shown in FIGURES 1 and 2 and in phantom in FIGURE 3. To prevent too rapid movement of the unit 12 between its said two positions or between its retracted position of FIGURE 3 and an intermediate position in contact with a vehicle, suitable means such as a fluid motor means 95 is provided to control the rate of movement of the brush head 50. The fluid motor means 95 comprises a cylindrical casing 96 pivotally connected by a pin 98 to a cross bar 100 extending between the gusset plates 44 of the arm 38 and includes a piston 102 movable in such cylinder and having the outer end of its rod 104 provided with an eye member 106 pivotally connected to the ear 60 of the bracket 52 of the brush head 50 by a pin stud 108 on the same side of the head pivot 54 as the link means eye pivot 94.

The cylinder 96 is full of fluid, such as oil, in the extended position of its piston and rod seen in FIGURES 3 and 4, the fluid being normally drawn by suction created by the retractive movement of the piston, from a source or reservoir 110 mounted on the hanger means arm 38 through suitable conduit means 112 extending between the cylinder 96 and the lower end of the reservoir 110. Positioned in the conduit line 110 is an adjustable flow control valve 114 of the Alkon model JF2 type made by Alkon Products Corporation of New Jersey which permits free flow of fluid, such as the oil from the reservoir 110 to the cylinder 96 but which by adjustment in or out of a manually operable tapered needle 116 can limit and control the rate of flow of the oil from the cylinder 96 to the reservoir 110. In this manner it can control the time it will take the brush unit 50 and brush 72 under the action of gravity or otherwise to move from the fully retracted position of FIGURE 3 to the fully extended position shown in phantom in FIGURE 3. A time interval of between 45 to 60 seconds has been found to provide a satisfactory operation of the brush unit. To limit the brush unit 50 in its fully extended position, the gusset plate 44 of the arm 38 is arranged to engage an adjustable rubber bumper or stop 118 carried by the angle bracket 32 of the support 16. With the described arrangement the brushes 72 may be kept out nearest the center line of vehicle travel. When subsequently a vehicle engages the brushes 72 to move them out, the piston 102 will suck oil from the reservoir 110 back into the cylinder 96 and will be in position by reason of the control valve 114 to fight any sudden movement of the brush toward its extended position as it follows the contour of the vehicle body, such as wheel wells, and will prevent the bristles of the brush from locking onto the bumpers for this reason and because of the predetermined direction of the brushes relative to the direction of car movement described above. Obviously the described means will function in a similar manner if the brush units 12, 14 are moved inwardly from their retracted position under command of the vehicle.

A control valve 120 similar to the valve 114 is provided at the upper end of the reservoir 110 and will normally be provided with a vent plug 122 which will permit the escape of air in the free flow direction of the valve or the vent may be replaced by an air connection to supply air under a pressure of approximately 40 p.s.i. on the oil column in the reservoir 110 and through the oil against the piston 102 to effect retraction of the brush unit 12 to its FIGURE 3 position. The valve may be adjusted by the needle control 116 to vary the rate of air flow such that the brush unit 12 does not slam when retracted in this manner, the piston actuating the brush head 50 and linkage 82 to swing the brush unit to its starting or retracted position of FIGURE 3.

In operation of the unit 12 of FIGURES 2 to 5 and assuming that a vehicle is moved toward the entrance side of the support 16 along a predetermined path, the vehicle will either encounter the brushes 72, 72a and retract them to an intermediate position against the action of gravity or other power means provided such as a spring to accommodate the width of the vehicle and permit effective cleaning of the vehicle side, or if the brushes 72, 72a are held retracted by fluid pressure means such as air acting on the oil column of the reservoir 110, the vehicle will preferably encounter a wand type of control (not shown) such as shown in Patent 3,236,960 which will cut off the application of air pressure on the oil in the reservoir 110 and permit the unit 52 to swing by gravity action, by spring, or by a separate power cylinder, as the case may be, into its operative extended position and after the vehicle has passed then reapply air pressure on the oil of the reservoir 110 to retract the unit. Such a wand control can also serve to control a solenoid valve to direct water and detergent or water alone through the liquid conduit means 124, 124a to the brushes 72, 72a, through the hollow cores thereof and also to the rinse or detergent sprays 126 arranged in the support 18. Moreover the wand control may also cause actuation of a relay 127 to apply electric power through the electrical lines 128, 128a to the motors 76, 76a to cause brush rotation in a direction corresponding to the vehicle movement at the point of contact, and at a higher linear rate than the vehicle movement to avoid any drag or other undesirable tendencies to which reference has been previously made.

Figure 7:
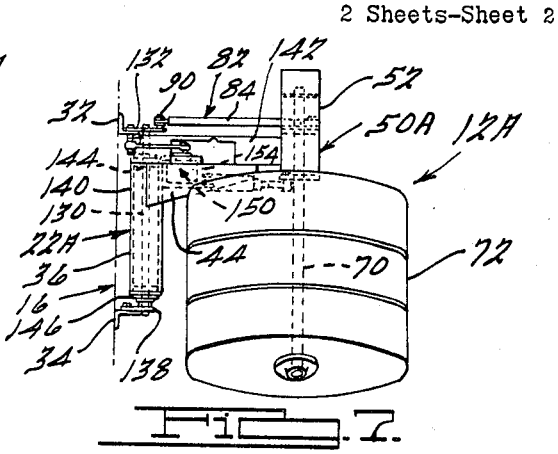
FIGURE 7 is an elevational view of the apparatus of FIGURE 6 looking in the direction of the arrows 7—7 in FIGURE 6.
Figure 8:
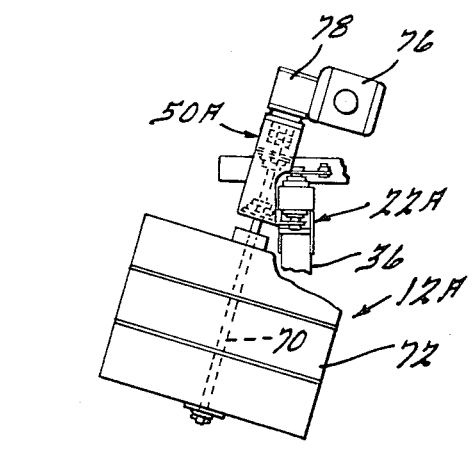
FIGURE 8 is a further elevational view of the apparatus of FIGURE 6 looking in the direction of the arrows 8—8 in FIGURE 6.

FIGURES 6, 7, and 8 show a modification of the structure in FIGURES 2 to 5, one unit 12a being shown, corresponding to the unit 12 of FIGURE 3. As seen it includes brush hanger means 22a pivotally supported by a fixed shaft or rod 130 welded to an upper plate 132 secured to the upper angle member 32 of the support 16 which is notched at 134 to prevent shift of the shaft, a single bolt 136 fixing the plate 132. The lower end of the shaft 130 is retained in the lower plate 138 secured to the lower angle member 34. The brush hanger means 22a also includes a vertical tubular post 140 to the upper end of which is welded an arm 142. The post 140 includes upper and lower bearing members 144, 146 which provide pivot journals for the brush hanger means on the shaft 130. It is to be noted that the pivotal axis of the brush hanger means in this modification is perfectly vertical and not inclined as in FIGURES 2 and 5 for reasons which will be hereinafter evident. The brush head means 50a is pivotally mounted on the arm 142 of the brush hanger means 22a at 148 in a manner generally similar to the brush head means 50 of the arrangement in FIGURES 3 to 5. The link means 82a for maintaining the brush head means at a constant angle throughout its swing between retracted and extended positions is also similar to the link means 82 of the FIGURE 3 arrangement. Hence these portions of the structure will not be further described.

The fluid motor means 95 and associated mechanism of FIGURES 2 to 5 for buffering the swing movement of the unit 12 and for retracting the same are in this modification of FIGURES 6 to 8 replaced by a conventional door closer or checking unit generally designated by the numeral 150, such as a commercially available Taco No. 4 door closer and by a differential pressure fluid motor means generally designated by the numeral 152. The unit 150 comprises a casing 154 secured to the arm 142 of the brush hanger means 22a and a lever 156 pivotally connected at 158 to one end of a link 160 which in turn is pivotally connected at 162 to an extension of the upper angle member 32. Internally of the casing 154 and not shown is a built in spring that acts to rotate the lever 156 counter-clockwise in FIGURE 6 to swing the brush unit 12a and brush 72 in the direction of the vehicle path and to keep it against the vehicle and when no vehicle is present to keep the brush in its fully extended position nearest to the center line of vehicle travel as permitted by the stop 118 secured to the under side of the upper angle member 32 and against which the gusset plate 44 of the arm 142 can abut. Internally of the casing 154 there also is a liquid dashpot which inhibits too rapid a movement of the brush unit towards a vehicle and fights any sudden movement towards its furthest extended position as the brush follows the contour of the vehicle body. The fluid motor 152 comprises a cylinder formed by a casing 164 pivotally connected to the hanger means arm 142 as at 166 and a piston 168 whose rod 179 is pivotally connected as at 172 to the bracket 52 of the brush head means 50a at a point on the opposite side of the brush head pivot 148 from the pivot 94 of the link means 82A. Application of air or oil under pressure to the piston end of the cylinder 164 will, through the reaction provided by the linkage means 82a act to return the unit 12a to the retracted position of the brush seen in FIGURE 6 and against the opposite tendency of the door closer spring. Liquid detergent and power may be brought to the brush unit 12a in the same manner as described with respect to the brush unit 12 of FIGURE 3.

Figure 9:
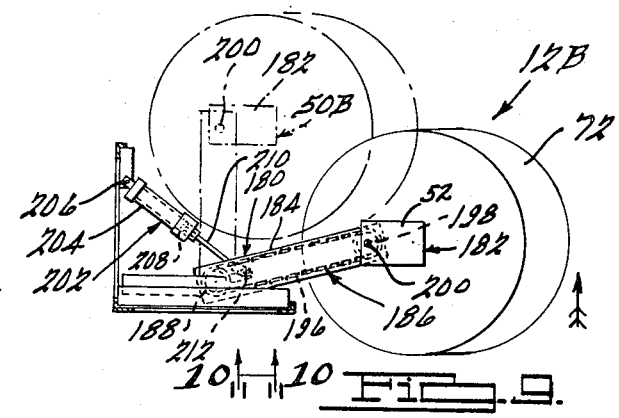
FIGURE 9 is a plan view of a further modification of the apparatus of the invention showing the use of a chain mechanism for providing a constant angle to the brush and a fluid motor for moving the brush structure between its retracted and extended positions.
Figure 11:
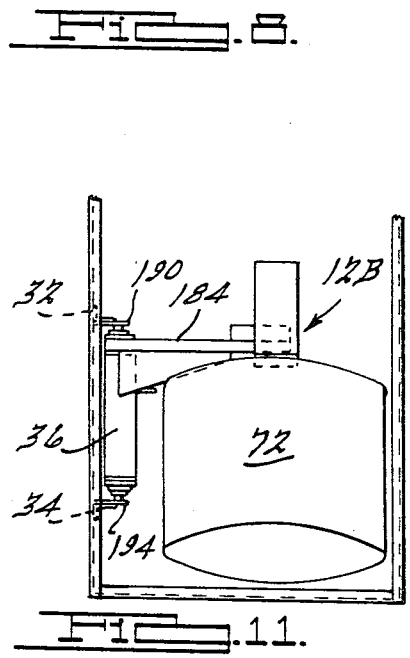
FIGURE 11 is an elevational view showing the apparatus looking in the direction of the arrows 11—11 in FIGURE 10.
Figure 10:
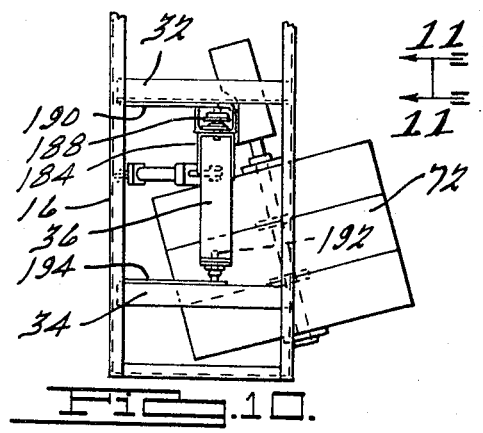
FIGURE 10 is an elevational view of the apparatus of FIGURE 9 looking in the direction of the arrows 10—10 in FIGURE 9.

FIGURES 9 to 11 illustrate a further modification of the invention in FIGURES 2 to 5, one unit, generally designated by the numeral 12B, being shown. The unit 12B comprises brush hanger means 180 and brush head means 182 pivotally secured to the arm 184 of the brush hanger means, each of the same general character and construction as the corresponding components of FIGURES 2 to 5. The construction here differs in that the means for maintaining the brush head at a constant angle throughout swing of the brush hanger means comprises a chain and sprocket arrangement, generally designated by the numeral 186, that includes a sprocket 188 fixed to a support plate 190 carried by the upper angle bracket 32 of the support 16, the sprocket having a lower pin extension which serves as the upper pivot for the hanger means post 36, the lower pivot being provided by a pin 192 secured to a lower support plate 194 carried by the lower angle bracket 34.

The toothed sprocket 188 is connected by an endless roller chain 196 of conventional link form with a second toothed sprocket 198, preferably of an equal number of teeth, fixed to and rotatable with the brush head bracket 52 of the brush head means 182 on the pivotal axis 200 thereof. It will be evident that any force applied to swing the arm 184 of the hanger means 180 from the retracted position of the brush unit 12B to its extended position will, by reason of the reaction at the fixed sprocket 188 and wrapping and unwrapping of the chain 196 at the sprocket 188 cause rotation of the sprocket 198 and opening of the angle between the brush head means 182 and hanger means arm 184 to maintain the former at the same angle relative to the vehicle path of movement as it had in the retracted position of the unit 12B throughout swing of such unit.

The construction in FIGURES 9 to 11 also provides differential pressure motor means, generally designated by the numeral 202 such as a fluid or air motor to actuate the brush 72 to its extended position shown in FIGURE 9 and to return it to its retracted position shown in phantom in FIGURE 9. Such motor means may consist of a casing 204 pivotally connected as at 206 to the support 16 and a piston 208 whose rod 210 is pivotally connected as at 212 to the brush hanger means 180. Thus application of air or fluid pressure to the end of the cylinder 204 opposite the piston 208 will actuate the brush hanger means 180 to the extended position shown in FIGURE 9 and venting of the cylinder and application of air or fluid pressure to the piston rod end of the motor means will cause retraction of the brush unit 12B to the position shown in phantom in FIGURE 9. It will be understood that suitable snubber or other controls such as described above with respect to the previous embodiments may be provided to determine the rate of movement of the brush to its extended position and to prevent a crash shift or retraction. It will also be evident that the timing of these shifts may be under control of a wand such as shown in Patent 3,236,960 actuated by the vehicle to be washed and that water and detergent or water alone may be delivered to the brush in the manner described above.

Although a preferred embodiment of the invention of the unique vehicle washing apparatus of the invention and several modifications have been shown and described herein it will be understood that various changes may be made in the apparatus as disclosed in the drawings and described above by those skilled in the art without departing from the principles and the spirit and intent of the invention. Accordingly, all changes and modifications as may come within the scope of the appended claims and all equivalents are contemplated.

I claim:
1. Washing apparatus for cleaning the lower side portions of a vehicle during relative movement of the apparatus and vehicle along a predetermined path of travel comprising support means for the apparatus, brush hanger means pivotally connected to said support means so as to be swingable toward and away from said path of travel between retracted and extended positions to accommodate vehicles of different width, brush head means pivotally connected to said hanger means outwardly of the pivotal axis of the latter, a brush rotatably supported by said brush head means on an axis spaced from the pivotal axis of the brush head means and at an angle thereto such that said brush axis slopes upwardly and outwardly with respect to the side of a vehicle in said path of travel and means operable between said apparatus support means and said brush head means for maintaining said brush slope substantially constant with respect to vertical planes extending longitudinally of said path representing the sides of vehicles travelling in said paths, in all normal swing positions of said brush hanger means.

2. Washing apparatus as claimed in claim 1 wherein the pivotal axis of said brush hanger means is such that said hanger means is normally urged by gravity to swing toward said path of travel.

3. Washing apparatus as claimed in claim 1 wherein said last mentioned means comprises link means having one end pivotally connected to said support means at a position spaced from the pivotal axis of said brush hanger means and having its other end pivotally connected to said brush head means at a position spaced from the pivotal axis of said brush head means, the distance between said pivotal axes of said link means and between the pivotal axes of said brush hanger means and brush head means, and between the pivotal axes respectively of said link means and the pivotal axes of said brush hanger means and brush head means respectively being such as to produce a substantial parallelogram when these pivotal axes are connected.

4. Washing apparatus as claimed in claim 1 wherein said last mentioned means comprises a toothed sprocket non-rotary fixed with respect to said support means and coaxial with said pivotal axis of said brush hanger means, a second toothed sprocket coaxial with the pivotal axis of said brush head means and rotatable with said brush head means, and an endless chain connecting said sprockets circumferentially thereof.

5. Washing apparatus as claimed in claim 1 including power means for rotably driving said brush in such manner that the periphery of the brush at the point of contact with a vehicle moves in the same general direction as the relative movement of the vehicle with respect to said apparatus.

6. Washing apparatus as claimed in claim 1 including means for controlling the rate of movement of the brush in moving toward a vehicle in said path from a retracted position of said brush.

7. Washing apparatus as claimed in claim 6 including pressure differential operated motor means for actuating the brush to said retracted position.

8. Washing apparatus as claimed in claim 6 wherein said control means comprises a fluid operable motor having a piston pivotally connected with said brush head means, a casing providing a cylinder for the piston and pivotally connected with said brush hanger means, a source of fluid, conduit means connecting said source and said casing to supply said cylinder with fluid to be acted upon by said piston, and control valve means in said conduit means for restricting flow of fluid from said cylinder to said source upon actuation of said piston.

9. Washing apparatus as claimed in claim 8 including means for applying pressure to the fluid in said reservoir for causing fluid flow between said reservoir and cylinder to actuate said piston to effect retraction of said brush.

10. Washing apparatus as claimed in claim 4 including power operable motor means operable between said support means for effecting movement of said brush toward and away from a vehicle in said predetermined path.

11. Washing apparatus as claimed in claim 6 wherein said control means comprises a fluid and spring actuated door check mechanism.

12. Washing apparatus as claimed in claim 6 wherein said control means comprises a fluid dashpot, a lever actuated piston, a link connecting said lever with said support means and a spring acting on said lever for urging said brush to said retracted position.

References Cited

UNITED STATES PATENTS

| | | | |
|---|---|---|---|
| 3,035,293 | 5/1962 | Larson | 15—21 |
| 3,070,821 | 1/1963 | Vani | 15—21 |
| 3,090,981 | 5/1963 | Vani et al. | 15—21 |

EDWARD L. ROBERTS, *Primary Examiner.*